Sept. 16, 1958   A. J. SHERMAN   2,851,795
SIMULATED CONTROL LOADING FOR FLIGHT TRAINING APPARATUS
Original Filed June 4, 1951   2 Sheets-Sheet 1
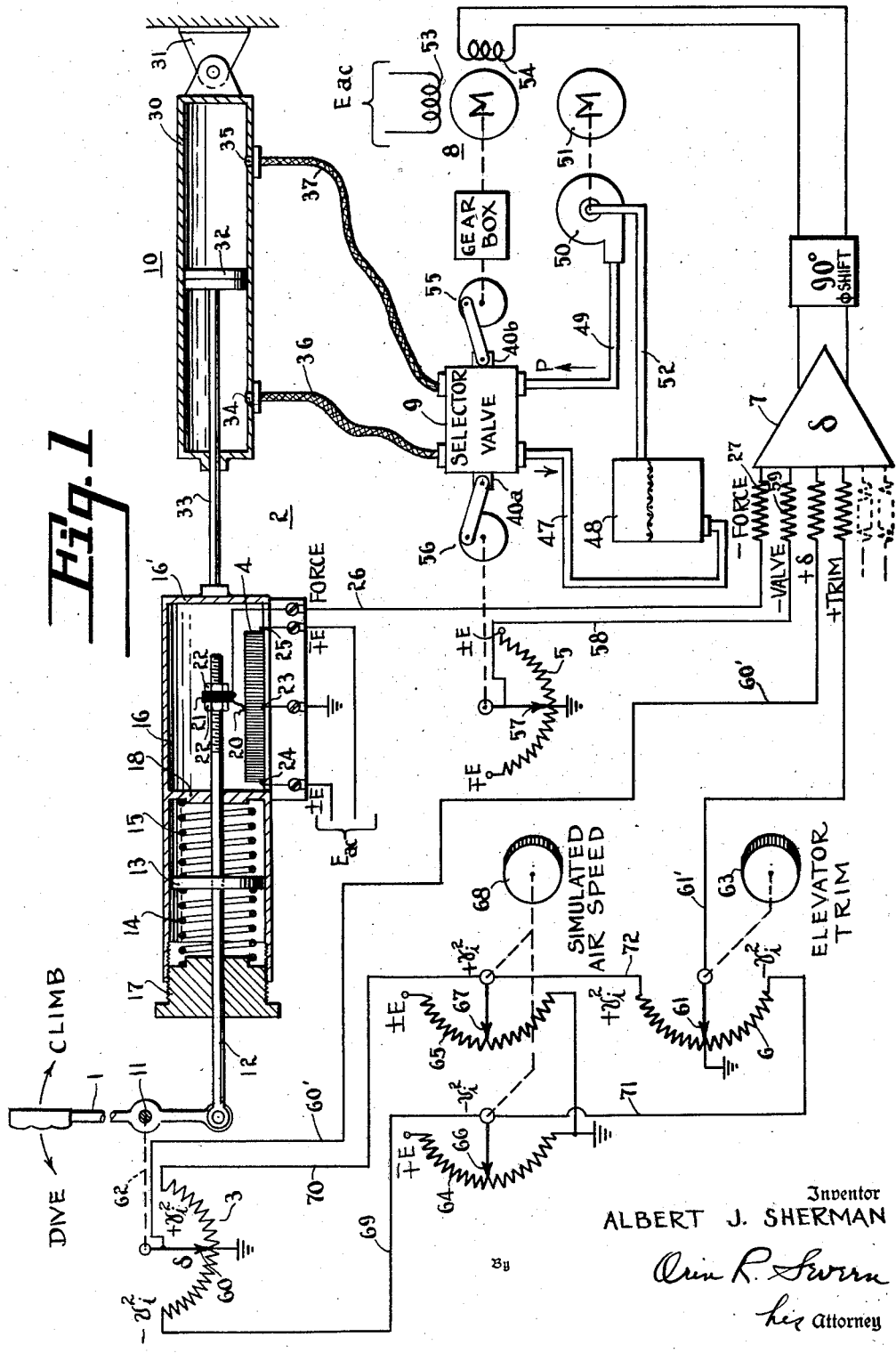
Inventor
ALBERT J. SHERMAN
his Attorney

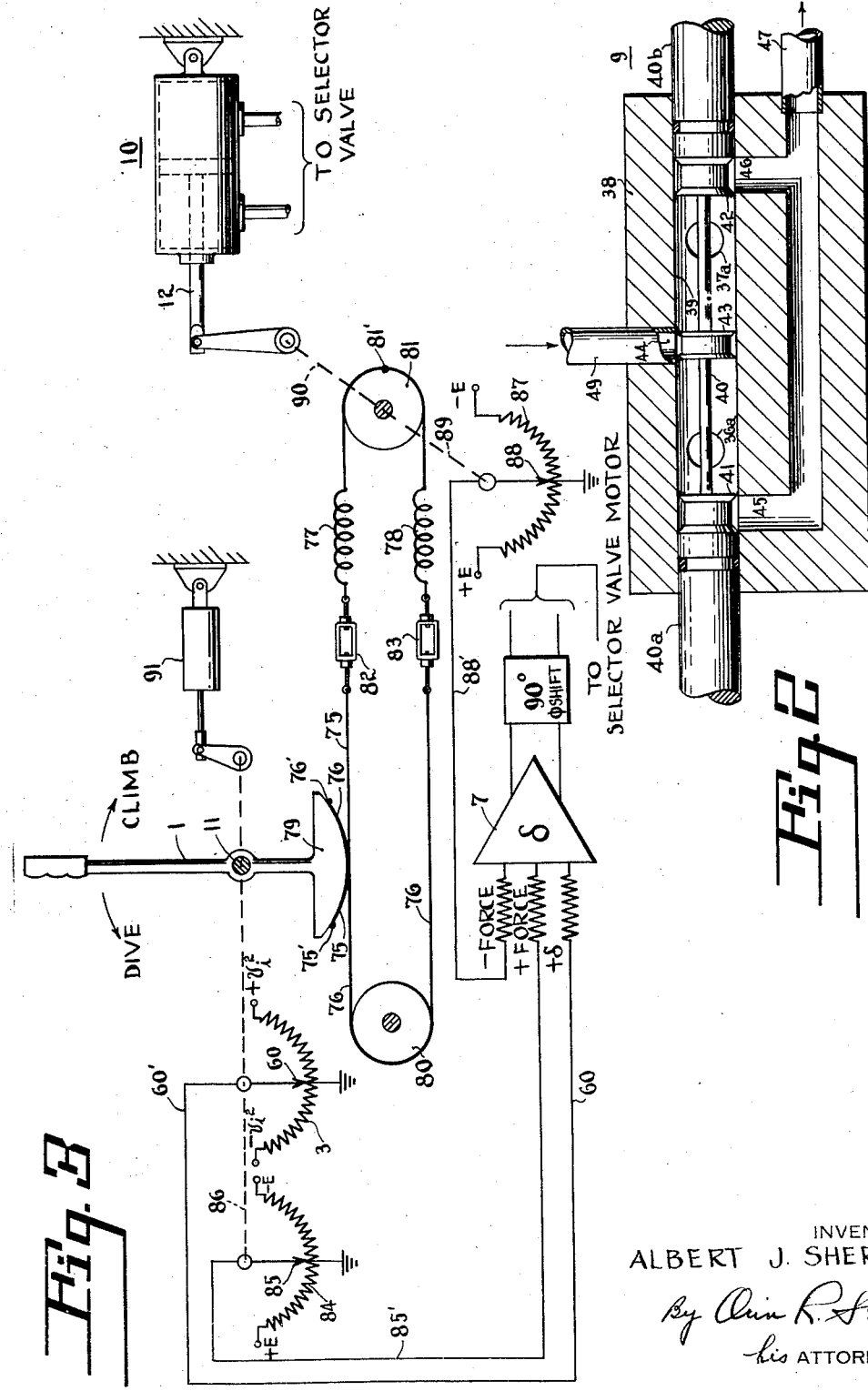

United States Patent Office 2,851,795
Patented Sept. 16, 1958

2,851,795

SIMULATED CONTROL LOADING FOR FLIGHT TRAINING APPARATUS

Albert Joseph Sherman, Morris Plains, N. J., assignor to Curtiss-Wright Corporation, a corporation of Delaware Continuation of application Serial No. 229,776, June 4, 1951. This application October 20, 1954, Serial No. 463,396

23 Claims. (Cl. 35—12)

This invention relates to simulated control loading for flight training apparatus of the character using simulated aircraft instruments and controls in a ground based pilot's station.

This application is a continuation of my orignal application S. N. 229,776, filed June 4, 1951, now abandoned.

In actual flight, an aircraft is caused to rotate angularly about its axes, generally designated the X, Y and Z axes, according to the turning moments produced about these axes by deflection of the ailerons, elevator and rudder respectively. Heretofore it has been the general practice in flight simulating apparatus for representing control loading to operate a deriving device, such as a potentiometer for example, from each control primarily according to the displacement of that control from a nominal neutral for producing a control quantity. The potentiometer or equivalent means for deriving the control quantity is energized by a voltage or control quantity varying according to an appropriate function of airspeed. Accordingly, the potential derived from the potentiometer with control deflection is a measure of and corresponds to the turning moment introduced according to the control displacement from the neutral position.

However in practice pilots fly aircraft not necessarily according to control displacement but by pressure on the controls. Hence, the pilot judges the fidelity of the simulation of the trainer by the reaction of the instruments to control pressure as well as displacement. For this reason, improved fidelity of simulation can be more readily obtained by producing a control quantity representing the aforesaid turning moment by both control pressure responsive means and displacement responsive means.

This arrangement has the further advantage that the pressure-deflection-airspeed characteristics of the control loading system need not be accurately reproduced in the simulating apparatus when using a pressure actuated potentiometer for example, as when using displacement actuation alone. This is due to the fact that the moment voltage derived is a pressure function of the control, considering the case of actual aircraft, whereas if related in the simulator to control displacement, the simulation of the relationship between the control displacement and pressure at every simulated airspeed must be very accurate. Accordingly, a further advantage is apparent in that simpler and more economic simulating equipment can be used because the pressure-displacement curves for any given airspeed need not be met as accurately as in training apparatus wherein moment voltages are derived from pressure responsive means.

A principal object of this invention therefore is to provide more faithful simulation of the "feel" of aircraft controls in actual flight by deriving control quantities representing control moments according to both pilot pressure applied to the respective control and the displacement of the control itself.

A further object of the invention is to provide improved control loading response by means of a follow-up control that is responsive jointly to factors representing the computed control pressure and the actual pilot pressure on the control.

In accordance with the invention, a simulated aircraft control is connected to force measuring means arranged to derive a control quantity representing force and also to means for deriving a computed control quantity representing a combined function of airspeed and control displacement. The force-measuring means in turn is adopted to be positioned by follow-up means, such as for example a hydraulic ram, that is responsive jointly to the aforesaid control quantities so that the actual control loading for an instant condition represents a resultant of several factors including airspeed, control displacement and control pressure.

The invention will be more fully set forth in the following description referring to the accompanying drawings, and the features of novelty will be pointed out with particularity in the claims annexed to and forming a part of this specification.

Referring to the drawings:

Fig. 1 is a partly diagrammatic and schematic illustration of a loading system for simulated aircraft controls specifically embodying the present invention as applied to a simulated elevator control;

Fig. 2 is a cross-sectional view of a spool-type selector valve used in the system of Fig. 1, and Fig. 3 is a schematic illustration of a modification of the force measuring arrangement of Fig. 1.

As shown in Fig. 1, a simulated aircraft control such as the elevator control or stick 1 is connected to combined force measuring and hydraulic follow-up apparatus generally indicated at 2. In general, this measuring and follow-up apparatus which determines the "loading" of the control, i. e., the resistance to movement of the control by the pilot in a direction away from neutral, is controlled in accordance with the combined effects of stick displacement and simulated airspeed as represented by the potentiometer 3, or equivalent means for producing a control quantity representing a computed loading force factor for given airspeed and control displacement; the force or pressure actually applied by the pilot to the stick as represented by the answer potentiometer 4; the degree of energization of the hydraulic follow-up means as represented by the potentiometer 5, and the amount of trim as represented by the potentiometer 6. The derived control quantities or voltages from the various deriving means or potentiometers are used to control, through a summing amplifier 7 and a motor 8, the position of a selector valve 9 that in turn controls a so-called hydraulic ram or follow-up device 10.

Other factors also affect to varying degrees the control loading, such as angle of attack, rate of pitch, thrust, etc., and these factors may be included where precise simulation of control loading is required. The presently described system, however, is sufficient to teach and practice the invention within reasonably realistic limits.

The control loading system of Fig. 1 is illustrated in connection with a single control, namely, the elevator or stick control; and, since the control equipment is essentially similar for the aileron and rudder controls such additional disclosure is believed to be superfluous and unnecessary for a complete understanding of the invention. The individual application of the present control loading system to each of the simulated aileron and rudder controls will be obvious to those skilled in the art from the description taken in connection with the drawings.

Specifically, the stick 1 is pivotally mounted on a shaft 11 for fore and aft movement representing dive and climb attitudes respectively. The lower end of the stick is pivotally connected to a rod 12 on which is secured a plunger 13 forming at its opposite sides seats for two force-measuring springs 14 and 15 respectively, all enclosed within a cylinder 16. The fixed ends of these springs are seated respectively on an adjustable cylinder bushing 17 and an inner flange 18 so that for a given position of the cylinder 16 the springs tend to center the plunger and hence the stick 1. The cylinder 16 is subject to longitudinal displacement by the ram or follow-up device 10 in a manner presently described.

The springs 14 and 15 are precompressed between their backing means and plunger 13 by adjustment of the bushing 17 to approximately one-half the estimated maximum stress. Hence, the apparatus is in effect a dynamometer since the relative movement between the plunger 13 and the cylinder 16 is a measure of force transmitted from the stick through the rod 12.

For the purpose of deriving a control quantity according to the aforesaid force measurement, the potentiometer 4 is suitably mounted in the cylinder 16 within an end section formed by the flange 18 and end wall 16' and is provided with a slider contact 20 that is carried by and suitably insulated from the rod 12. The contact 20 may for example be mounted on an insulating bushing 21 that is adjustably positioned on a threaded portion of the rod 12 by means of nuts 22. The potentiometer as shown is provided with a grounded center tap at 23 and the slider contact 20 is adjusted so that it is centered on this tap when the plunger 13 is freely centered by its springs. The end terminals 24 and 25 are connected to a source of oppositely phased A. C. voltage having the instant polarity indicated and the slider contact is connected by conductor 26 to the input side of summing amplifier 7 through a proportioning resistance 27.

The position of the cylinder 16 is determined by the fast-acting hydraulic ram 10 which comprises an elongated cylinder 30 that is pivotally mounted at one end for rocking movement to a fixed support 31. A piston 32 is rigidly connected by means of a rod 33 to the cylinder end wall 16' as indicated and is mounted for reciprocal movement within the cylinder according to hydraulic pressure selectively admitted to opposite ends of the cylinder through ports 34 and 35. These ports are connected by pipes 36 and 37 to the selector valve 9 which is of the fast-acting type.

A detail view of a simplified form of spool-type selector valve having no "dead" zones is shown by Fig. 2. The valve housing 38 is provided with a central transverse bore 39 within which the valve spindle 40 is operated for reciprocal movement. In the neutral position shown the valves 41 and 42 cover the exhaust ports 45 and 46 and the valve 43 covers the pressure port 44 so that no pressure from the pressure port is admitted to the ram cylinder 10 by way of ports 36a, 37a and pipes 36 and 37 respectively. It will be apparent that lateral movement of the valve spindle 40 in either direction opens the pressure port as well as one of the exhaust ports to a variable degree so that pressure oil is transmitted to one side or the other of the ram piston 32.

The exhaust ports 45 and 46 are controlled in conventional manner by the valves 41 and 42 for admitting the return oil to a pipe 47 leading to the sump 48, Fig. 1. The pressure port 44 is connected by a pipe 49 to a suitable source of standby pressure such as a high speed centrifugal pump 50 that is driven by a constant speed motor 51 of moderate power rating. The return oil from the sump 48 is directed to the pump intake through a pipe 52.

The operating means for the selector valve 9 comprises a two-phase A. C. motor 8 that is energized according to the output of the amplifier 7. The motor is operated in conventional manner by means of a winding 53 connected to an A. C. reference voltage source and a control winding 54 that is connected to the output side of amplifier 7 through a 90° phase shifter as indicated. The motor is suitably connected to the valve spindle 40, such as through reducing gears, etc., for shifting the valves in one direction or the other according to the sense of the amplifier output. For example, a pitman 55 may be used for connecting the motor through its gear box to the valve spindle at 40b for precisely positioning the valves with respect to the related ports. The opposite end of the valve spindle at 40a is similarly connected through a pitman 56 to the slider contact 57 of the valve potentiometer 5. The slider contact is centered on the middle ground tap of the potentiometer when the valve is in its neutral position, i. e. for closing the pressure port 44, and the terminals of the potentiometer are energized by an oppositely phased A. C. voltage that may be polarized as indicated. The slider 57 is connected by conductor 58 to the input side of amplifier 7 through the proportioning resistance 59.

The remaining electrical inputs to the amplifier 7 include a voltage from the slider contact 60 of the potentiometer 3 representing a combined function of air speed and control displacements, and a voltage representing the effect of simulated elevator trim from the slider contact 61 of the trim potentiometer 6. The slider 60 of potentiometer 3 is connected by conductor 60' to the input side of amplifier 7 and is suitably positioned by mechanical means indicated at 62 according to the position of stick 1. The potentiometer 3 has a grounded center tap and is energized at its terminals by an oppositely phased A. C. voltage polarized as indicated and variable according to the square of simulated indicated air speed ($v_i^2$). The air speed voltage is in turn derived from a double potentiometer 64, 65, each section of which is suitably contoured or proportioned in well-known manner for deriving voltages according to a square function. The respective sliders 66 and 67 are simultaneously positioned according to simulated air speed by any suitable means such as a manual dial 68, or, in the case where flight computing apparatus is used, by the air speed servo. The double potentiometer 64, 65 is energized as indicated from a source of oppositely phased A. C. voltage and the derived voltages at contacts 66 and 67 which represent $-v_i^2$ and $+v_i^2$ respectively, are led by conductors 69 and 70 to the terminals of potentiometer 3.

The potentiometer 6 is also energized according to oppositely phased values of $v_i^2$ by means of conductors 71 and 72 interconnecting the sliders 66 and 67 and the terminals of potentiometer 6, and the slider 61 of potentiometer 6 is connected by conductor 61' to the input side of amplifier 7 and is positioned according to simulated trim by means of a manual dial 63. It will be understood of course that the mechanical connections to the various potentiometers may, where required, include suitable reduction gearing for insuring precise voltage derivation.

Summarizing the functions of the above-described potentiometers, there is derived from the displacement potentiometer 3 an A. C. voltage $e_s$ representing a computed loading force component involving a combined function of air speed and stick displacement and varying in phase or sense according to the direction of displacement; from the force potentiometer 4 an answer signal voltage $e_F$ representing the stick pressure or force applied by the pilot and varying in phase or sense according to the direction of the force; from the valve potentiometer 5 an anticipatory signal voltage $e_V$ representing the degree of valve opening and varying in phase or sense according to the port to which the pressure is directed; and from the trim potentiometer 6 an additional computed force voltage $e_T$ varying in magnitude and phase according to the amount and sense of trim. These force voltages are phased so that the applied force signals $e_V$ and $e_F$ constitute "answer" voltages for the oppositely phased computed inputs $e_s$ and $e_T$. If additional inputs involving angle of attack, etc. are used as previously indicated for affecting control loading they are phased as required to provide correct simulation.

Accordingly, the resultant (algebraic sum) voltage from the amplifier 7 corresponds to the change in force required to represent the instant loading of the control. That is, the resultant voltage is zero if the force at the stick is correct, i. e., the applied stick force "answers" the computed loading force. If the resultant voltage is not zero, it produces a follow-up action of the hydraulic ram so as to produce stick force and position input voltages that reduce the output voltage to zero, so that the correct force or stick displacement correspond to all the other input signals.

Operation of the system is as follows: Assume that the pilot while "flying" level at a constant air speed pulls back on the stick for simulating a climb maneuver. Since the hydraulic ram initially holds the cylinder 16 stationary due to closure of both exhaust valves 41 and 42, the spring 14 is compressed as the rod 12 starts to move toward the left and a voltage $+e_F$ is derived from the answer force potentiometer 4. At the same instant a voltage $-e_\delta$ representing the computed loading force is derived from the displacement potentiometer 3. If these voltages should be of equal magnitude (assuming for the moment that no trim is needed) the output of the amplifier 7 is zero and the valve remains on neutral. Hence voltage $e_V$ is zero. For this assumed instant condition the control loading force exerted by the springs is proper for the assumed air speed and elevator control deflection.

If now the simulated air speed is decreased due to the resulting climb attitude, voltage $e_\delta$ decreases due to the decrease of $v_i^2$ and the answer signal voltage $e_F$ is dominant. The resultant voltage from the amplifier 7 now runs the motor 8 in a direction to open the valve 43 so as to admit pressure to port 37a, at the same time opening the valve 41 at exhaust port 45, thereby admitting pressure oil to the right side of piston 32 and causing the ram 10 to move the spring cylinder 16 toward the left. This action eases the tension on spring 14 and thus lessens the load on the stick. Thus the pilot "feels" a lighter load on the control due to simulated decrease in air speed. At the same time that the valve 43 opens, the voltage $-e_V$ from the valve potentiometer is increased and the voltage $+e_F$ from the answer signal force potentiometer 4 is decreased due to shifting of the resistance element of potentiometer 4 which is fixed to the cylinder 16, with respect to the rod 12 and associated slider contact 20. This relative movement between the two elements of the potentiometer 4 causes the derived voltage $e_F$ to represent both the stick and actuator force components.

The positive voltage $e_F$ is now dominated by the combined negative voltages $e_\delta$ and $e_V$ and the resultant voltage from amplifier 7 causes operation of the motor 8 in the opposite direction to close the valve. As the valve closes the voltage $e_V$ decreases to zero and the voltages $e_\delta$ and $e_F$ approach a balance for the instant condition. The answer voltage $e_V$ is polarized so that it tends to cause closing of the selector valve.

It is assumed in the above described operation that the pilot automatically eases pressure on the stick as he "feels" the air speed decreasing so as to maintain substantially constant climb attitude. If however he should continue to pull on the stick with the same force the following control operations would take place: Instead of the above described ram operation wherein the tension on spring 14 was reduced by shifting of the cylinder 16 toward the left, the stick pressure would take up the hydraulic ram follow-up movement with resulting greater aft displacement of the stick. The voltage $-e_\delta$ would become either more or less negative depending on the change in air speed. The voltage $e_F$ would initially tend to decrease due to the follow-up operation of the hydraulic ram but the continued stick pressure would tend to bring the voltage back to substantially the same original value since, as above pointed out, the pilot continues to apply the same stick force. However this new instant condition representing an increased climb attitude tending toward an inside loop causes further decrease in air speed and repetition of the above described value operating cycle. Actually, where the stick pressure is evenly and steadily applied, the valve 43 is cracked slightly at the pressure port 44 to admit pressure oil to port 37a and therefore to the right side of the hydraulic ram so that the ram follows up smoothly as air speed decreases until the simulated maneuver reaches the top of the loop, after which the simulated increase in air speed tends to make voltage $e_\delta$ more negative thus causing the resultant voltage from amplifier 7 to reverse the operation of the valve motor 8 to crack the valve 43 in the opposite direction so as to admit pressure to port 36a and therefore to the left side of the hydraulic ram. In this manner the hydraulic ram smoothly follows the spring plunger in the opposite direction as the air speed continues to increase for simulating increased control loading.

The operation is essentially the same for a dive maneuver wherein the stick is pushed forward so as to derive from potentiometer 3 a voltage $+e_\delta$ and from the force potentiometer 4 a voltage $-e_F$. In this case for the instant condition, the two voltages if not equal in magnitude are balanced by operation of the valve motor 8 in a direction corresponding to the sense of the unbalance. Thus, the elements of the potentiometer 4 are positioned so that the voltages are balanced. As the simulated dive continues, the air speed increases so as to increase voltage $+e_\delta$ thus causing operation of the valve motor 8 in a direction to crack the valve 43 to admit pressure to the port 37a so that the hydraulic ram tends to compress spring 15 and increase the loading force for the assumed stick position. Therefore the stick pressure in this case must be increased by the pilot up to the terminal air speed for maintaining a constant dive attitude since otherwise the hydraulic ram in its follow-up operation would cause the stick to move (by pressure of spring 15) toward neutral or level flight position. Relatively prompt and fast follow-up action of the hydraulic ram is facilitated by means of the high speed centrifugal pump and motor system. Since the motor is continually running at constant high speed, it can be of low power rating and still deliver high pressure. The centrifugal pump in turn insures a steady stand-by pressure, so that adequate power is always available. Thus the system has the advantages of both power and speed.

It is therefore seen that the hydraulic ram through its control means serves promptly to follow-up the stick operation according to the change in applied stick force as represented by the voltage $e_F$ and that for a steady-state condition the ram serves to hold the spring cylinder 16 fixed as long as the selector valve remains in its neutral closed position. In case of oil leakage around the valves or ram piston the slight change in position of the ram piston 32 is instantly corrected by reason of the resulting change in voltage $e_F$ which causes operation of the valve motor 8 sufficiently to crack the selector valve and restore the piston position.

Where a high degree of sensitivity is required and the valve motor 8 is not sufficiently sensitive to small signal voltages, centering springs for the selector valve 9 can be used in lieu of the valve answer potentiometer 5. In such a case, the potentiometer 5 is dispensed with and the valve spindle 40 is urged toward the neutral closed position illustrated by two opposing pre-compressed springs generally in the same manner as the springs 14 and 15 acting on the plunger 13. Thus where a small signal is insufficient by itself to close the valve, the valve centering springs function to do so.

When the pilot wishes to simulate trimming of the control, the potentiometer 6 is adjusted by dial 63 for deriving a "trim" voltage $e_T$. This voltage causes movement of the ram in one direction or the other, depending on the sense of the trim, to position the stick at a new neutral position which is established when $e_\delta$ equals $e_T$. In this position the slider 20 is centered by the springs 14 and 15 so that $e_F$ is zero.

In special cases where booster control, i. e. servo operated control, is simulated, another flight condition factor such as acceleration for example, may be used in place of or in combination with an airspeed function so as to simulate a specified booster "feel."

In the modified system shown by Fig. 3 the force sensing means is arranged to derive two separate components of the applied control force as represented by the stick and the actuator respectively. The component quantities are combined and used for controlling the valve motor in essentially the same manner as previously described. The stick 1 in this case is connected at its lower end to a pair of cables 75 and 76 that are attached to the force-measuring springs 77 and 78 respectively. For this purpose the stick is provided with an arcuate portion 79 having a contour concentric with the stick pivot 11. The cable 75 is suitably secured at 75' to the member 79 and the cable 76 is similarly secured at 76'. The cables and springs are connected in a closed loop as illustrated on the pulleys 80 and 81, the section of cable interconnecting the springs being suitably anchored to the pulley 81 at 81' to prevent slipping. The springs 77 and 78 are pretensioned as required for centering the stick by suitable means such as the turnbuckles 82 and 83 respectively.

A potentiometer 84 for deriving an answer signal representing the stick component of the control force has its slider contact 85 operatively connected to the stick as indicated at 86. The potentiometer has a grounded center tap and is energized at its terminals by an oppositely phased A. C. voltage as indicated. The derived voltage at slider 85 is led by conductor 85' to the summing amplifier 7. In opposition to this input voltage, another voltage of opposite polarity is derived from the potentiometer 87 according to the actuator component of the control force. This potentiometer also has a grounded center tap and is energized at its terminals by an oppositely phased voltage as indicated. The derived voltage from slider contact 88 is led by conductor 88' to the amplifier 7 and the slider is operatively connected at 89 to the pulley 81 which in turn is connected to the rod 33 of the hydraulic ram 10 by suitable linkage means indicated at 90. Thus the difference between the derived voltages from potentiometers 84 and 87 represents the answer force at the summing amplifier 7 i. e., the answer quantity corresponding to the answer signal voltage $e_F$ used in Fig. 1. In addition to the above-described inputs, the stick is connected to the previously described displacement potentiometer 3 so that a derived voltage $e_\delta$ from slider 60 representing the completed force is led by conductor 60' to the amplifier 7 as in the case of Fig. 1. Trim (not shown) may be applied in the same manner as Fig. 1 by adjusting a similar trim potentiometer for applying a trim signal to the amplifier 7. This signal is balanced by the signal from potentiometer 3 for the correct trim position.

The system of Fig. 3 operates essentially in the manner of Fig. 1 since the hydraulic ram actuator 10 is operated in the same manner to position the pulley 81, which in effect constitutes the spring backing means. The main difference resides in the derivation of the answer signal force voltage $e_F$, this voltage in the case of Fig. 3 being derived as two individual components. For example, assuming a climb attitude the stick component (represented as positive) is first derived from the potentiometer 84. This causes operation of the valve motor to position the ram or actuator so as to derive an actuator component (represented as negative) from the potentiometer 87. This component is combined with the stick component. When the resultant ($e_F$) balances $e_\delta$ from the potentiometer 3 the valve closes. This operation corresponds to the relative movement of the slider contact (stick component) and the resistance element (actuator component) of the potentiometer 4. Therefore by positioning the pulley 81 according to the resultant output from amplifier 7, the same follow-up action by the springs 77 and 78 with respect to the stick is obtained as in the case of springs 14 and 15 of Fig. 1. When the springs 77 and 78 are under equal strain it will be seen that the component force signals from the potentiometers 84 and 87 balance each other so that the composite answer signal is zero. This condition obtains in the neutral or trimmed condition. A difference in the spring stresses indicating applied stick force produces a composite answer signal for adjusting accordingly the actuator 10. Where any tendency toward oscillation exists a damper 91 can if desired be connected as indicated to the stick 1.

Though but a single embodiment illustrating the invention has been illustrated and described, it is to be understood that the invention may be applied in various forms. Changes may be made in the arrangements shown without departing from the spirit or scope of the invention as will be apparent to those skilled in the art and reference should be made to the appended claims for a definition of the limits of the invention.

What is claimed is:

1. In ground-based flight training apparatus having simulated aircraft controls operable by a student pilot and means for representing the airspeed of a simulated flight, means for loading said controls to simulate aerodynamic flight conditions comprising motive power means operatively connected to a respective control for varying opposition to the force applied by the pilot tending to displace the control from a neutral position in accordance with varying flight conditions, force responsive means operatively connected to said control for producing a first control quantity representing the pilot applied force as distinguished from control displacement, means for producing a second control quantity according to said control displacement and simulated airspeed opposite in sense to the first control quantity and representing the computed loading force, and computing means responsive to the difference between said first and second control quantities for producing a resultant control quantity for in turn controlling said motive power means.

2. In ground-based flight training apparatus having simulated aircraft controls operable by a student pilot and flight representing means for producing control quantities representing a function of airspeed, means for loading said controls to simulate aerodynamic flight conditions comprising motive power means operatively connected to a respective control for varying opposition to the force applied by the pilot tending to displace the control from a neutral position in accordance with varying flight conditions, force responsive means operatively connected to said control for producing a control quantity representing pilot applied pressure as distinguished from control displacement, means for producing a control quantity according to said control displacement, and computing means for producing a resultant control quantity for controlling said motive means, said computing means being responsive to the difference between the control quantity representing said applied pressure and a composite control quantity representing functions of airspeed and aircraft control displacement.

3. In ground-based flight training apparatus having simulated aircraft flight controls operable by a student pilot and flight simulating means for producing control voltages representing functions of simulated airspeed, means for loading a respective flight control to simulate flight conditions comprising motive power means operatively connected to said control for varying opposition to the force applied by the pilot tending to move the control from a neutral position, force responsive means operatively connected to said control and to said motive power means for deriving control voltage representing the applied force on said flight control as distinguished from control displacement, means operatively connected to said control and energized by an airspeed function voltage for deriving control voltage in accordance with control displacement representing a computed loading force component, and computing means responsive to said applied and loading force voltages for controlling said motive power means.

4. In ground based flight training apparatus having simulated aircraft flight controls operable by a student pilot and flight simulating means for producing control voltages representing functions of simulated airspeed, means responsive to the operation of said controls for producing voltages representing functions of airspeed and control displacement, means for loading said controls to simulate flight conditions comprising motive power means operatively connected to a respective flight control for varying opposition to the force applied by the pilot tending to move the control from a neutral position, means operatively interconnecting said control and said motive power means for conjointly deriving a control voltage representing the applied force on said flight control as distinguished from control displacement, and computing means jointly controlled by said applied force voltage and other voltages representing a function of airspeed and control displacement, said motive power means being responsive to said computing means for controlling the loading force on said control.

5. In ground-based flight training apparatus having simulated aircraft controls operable by a student pilot and flight simulating means for producing control voltages representing a function of airspeed, means for loading said controls to simulate flight conditions comprising motive power means operatively connected to a respective control for opposing to a variable degree the force applied by the pilot tending to move the control from a neutral position, force responsive means connected to said control for deriving a voltage representing applied control pressure as distinguished from control displacement, means for deriving a second control voltage jointly according to the magnitude of said airspeed function voltage and the displacement of said control from neutral and means for energizing said motive power means according to the magnitude and sense of the resultant of said applied pressure voltage and said second control voltage.

6. In ground-based flight training apparatus having simulated aircraft controls operable by a student pilot and means for producing control quantities representing a function of airspeed, means for loading said controls to simulate flight conditions comprising motive power means operatively connected to a respective control for opposing to a variable degree the force applied by the pilot tending to move the control from a neutral position, force responsive means operatively connected to said control for producing a control quantity representing said applied force as distinguished from control displacement, and means for energizing said motive power means in accordance with the difference between a composite control quantity representing functions of control displacement and airspeed, and said applied force control quantity constituting a feedback signal betwen said force responsive means and motive power means.

7. In ground-based flight training apparatus having simulated aircraft controls operable by a student pilot and flight representing means for producing control quantities representing a function of airspeed, means for loading said controls to simulate aerodynamic flight conditions comprising fluid-controlled motive power means operatively connected to a respective control for varying opposition to the force applied by the pilot tending to displace the control from a neutral position in accordance with varying flight conditions, force responsive means operatively connected to said control for producing a control quantity representing applied control pressure as distinguished from control displacement, fluid control means operatively connected to said motive means, means for producing a control quantity according to said control displacement, and computing means for producing a resultant control quantity for controlling said fluid control means, said computing means being responsive jointly to control quantities representing respectively said applied pressure, a function of airspeed and aircraft control displacement.

8. In ground-based flight training apparatus having simulated aircraft controls operable by a student pilot and flight representing means for producing control quantities representing a function of airspeed, means for loading said controls to simulate aerodynamic flight conditions comprising fluid-controlled motive power means operatively connected to a respecttive control for varying opposition to the force applied by the pilot tending to displace the control from a neutral position in accordance with varying flight conditions, force responsive means operatively connected to said control for producing a control quantity representing applied control pressure as distinguished from control displacement, a control valve operatively connected to said motive power means, a motor for controlling said valve, means for producing a control quantity according to said control displacement, and computing means for producing a resultant control quantity for operating said motor, said computing means being responsive to the difference between a composite control quantity representing respectively functions of air speed and aircraft control displacement, and said applied pressure control quantity.

9. In ground-based flight training apparatus having a simulated aircraft control operable by a student pilot and means for producing voltages representing functions of airspeed and control displacement, means for loading said control in simulation of flight conditions comprising oppositely acting pretensioned springs operatively connected to said control, spring backing means selectively movable to increase the tension at one spring and decrease the tension at the opposing spring, follow-up actuator means operatively connected to said backing means for positioning the same, means associated with said control and actuator respectively for conjointly deriving control voltages representing the pilot applied force, force computing means jointly controlled by said control voltages and the voltages representing functions of airspeed and control displacement, and motive power means responsive to said force computing means for positioning said actuator in sense and degree according to the resultant of said voltages.

10. In ground based flight training apparatus having a simulated aircraft control operable by a student pilot and means for producing a control quantity representing a function of airspeed, means for loading said control in simulation of flight conditions comprising means responsive to said control and to the quantity representing simulated airspeed for deriving a control quantity representing a function of air sped and control displacement and corresponding to a loading force component, force responsive means operatively connected through a yielding connection to said control including means for deriving another control quantity representing force actually applied by the pilot to said control, a follow-up device for positioning said force responsive means with respect to said control whereby the resistance to displacement of said control may be varied, and means for controlling the operation of said follow-up device including motive means jointly responsive to both said control quantities according to the sense and magnitude of the resultant thereof.

11. In ground based flight training apparatus having a simulated aircraft control operable by a student pilot and means for producing a control quantity representing a function of a flight condition, means for loading said control in simulation of flight conditions comprising means responsive to said control and to the quantity representing a simulated flight condition for deriving control potential representing a loading force component, force responsive means operatively connected through a resilient connection to said control including means for deriving another control potential representing force actually applied by the pilot to said control, a fast acting hydraulic follow-up device for positioning said force responsive means with respect to said control whereby the resistance to displacement of said control may be varied, and means for selectively controlling the operation of said hydraulic follow-up device including a valve having motive means jointly responsive to both said control potentials.

12. In ground based flight training apparatus having a simulated aircraft control operable by a student pilot and means for producing a control quantity representing a function of a flight condition, means for loading said control in simulation of flight conditions comprising means responsive to said control and to the quantity representing a simulated flight condition for deriving control potential, resilient structure operatively connected to said control for opposing movement of said control from a neutral position, movable backing means for said resilient structure, means associated with said control and backing means respectively for conjointly deriving potential representing the force actually applied by the pilot to said control, follow-up means for positioning said backing means whereby the resistance to displacement of said control may be varied, means for controlling the sense and degree of movement of said follow-up means, and electrical means controlled by the aforesaid derived potentials according to the sense and magnitude of the resultant potential for controlling the operation of said controlling means.

13. In ground based flight training apparatus having a simulated aircraft control operable by a student pilot, means for loading said control in simulation of flight conditions comprising oppositely acting pretensioned springs operatively connected to said control, spring backing means selectively movable to increase the tension at one spring and decrease the tension at the opposing spring, hydraulic follow-up actuator means operatively connected to said backing means for positioning the same, means associated with said control and actuator respectively for deriving control voltages representing combined functions of a flight condition, the displacement of said control from a neutral position, and the pilot applied and actuator components of force applied to said control, a source of hydraulic pressure including a motor operated centrifugal pump, valve means for controlling application of said pressure to said hydraulic actuator means, and electric motive means jointly controlled by said control voltages for positioning said valve means in sense and degree according to the resultant of said voltages.

14. In ground based flight training apparatus having a simulated aircraft control operable by a student pilot and means for producing a control quantity representing a function of a flight condition, means for loading said control in simulation of flight conditions comprising means responsive to said control and to the quantity representing a simulated flight condition for deriving control potential representing a loading force component, a pair of pretensioned springs operatively connected to said control for opposing movement of said control from a neutral position, movable backing means for said springs, means associated with said control and backing means respectively for conjointly deriving potential representing the force actually applied by the pilot to said control, hydraulic follow-up means for positioning said backing means whereby the resistance to displacement of said control may be varied, selector valve means for controlling the sense and degree of movement of said hydraulic follow-up means, and electrical means jointly controlled by the aforesaid derived potentials for controlling the operation of said selector valve means.

15. In ground based flight training apparatus having a simulated aircraft control operable by a student pilot and means for producing a control quantity representing a function of a flight condition, means for loading said control in simulation of flight conditions comprising means responsive to said control and to the quantity representing a simulated flight condition for deriving control potential representing a loading force component, yielding structure operatively connected to said control for opposing movement of said control from a neutral position, movable backing means for said structure, potentiometer means associated with said control and backing means for conjointly deriving potential representing the force actually applied by the pilot to said control, follow-up means for positioning said backing means whereby the resistance to displacement of said control may be varied, and reversible motor means jointly controlled by the aforesaid derived potential according to the sense and magnitude of the resultant for controlling the operation of said follow-up means.

16. In ground based flight training apparatus having a simulated aircraft control operable by a student pilot and means for producing a control quantity representing a function of a flight condition, means for loading said control in simulation of flight conditions comprising means responsive to said control and to the quantity representing a simulated flight condition for deriving control potential representing a loading force component, force responsive means operatively connected through a yielding connection to said control including means for deriving another control potential representing force actually applied by the pilot to said control, means for positioning said force responsive means whereby the resistance to displacement of said control may be varied, said deriving means being controlled according to the relative positions of said positioning means and said control, and means for causing fast follow-up operation of said positioning means including electric control means jointly responsive to both said control potentials.

17. In ground based flight training apparatus having a simulated aircraft control operable by a student pilot and means for producing a control quantity representing a function of a flight condition, and means for loading said control in simulation of flight conditions comprising means responsive to said control and to the quantity representing a simulated flight condition for deriving control potential for representing a combined function of said flight condition and control displacement, pretensioned spring structure operatively connected to said control for opposing movement of said control from a neutral position, movable backing means for said spring structure, means responsive to relative movement between said control and backing means for conjointly deriving potential representing the force actually applied by the pilot to said control, fast acting follow-up means for positioning said backing means whereby the resistance to displacement of said control may be varied, selector means for controlling the sense and degree of movement of said follow-up means for determining the "feel" of said control, and electrical means jointly controlled by the aforesaid derived potentials for controlling the operation of said selector means.

18. In ground based flight training apparatus having a simulated aircraft control operable by a student pilot and means for producing a control quantity representing a function of airspeed, means for loading said control in simulation of flight conditions comprising potentiometer means responsive to said control and to the quantity representing air speed for deriving a first control voltage representing a combined function of air speed and control displacement corresponding to a loading force component, a force metering device operatively connected to said control for opposing movement of said control from a neutral position, movable backing means for said device, potentiometer means having relatively movable elements connected to said control and backing means respectively for conjointly deriving a second voltage representing the force actually applied by the pilot to said control, fast acting follow-up means for positioning said backing means whereby the resistance to displacement of said control may be varied, means for controlling the sense and degree of movement of said follow-up means, electrical motive means for controlling the operation of said controlling means, and electronic means for controlling said motive means according to the resultant of said derived voltages.

19. In ground based flight training apparatus having a simulated aircraft control operable by a student pilot, means for loading said control in simulation of flight conditions comprising a potentiometer energized according to variation in simulated air speed and responsive to said control for deriving a first control voltage representing a combined function of air speed and control displacement corresponding to a loading force component pretensioned spring structure operatively connected to said control for resisting displacement thereof from a neutral position, backing means for said spring structure, a follow-up hydraulic actuator for varying the position of said backing means for varying the effectiveness of said spring structure acting on said control, a second potentiometer connected to said control and said backing means respectively for conjointly deriving a second control voltage representing the force actually applied to said control by the pilot, selector valve means for controlling operation of said actuator, a potentiometer responsive to said valve means for deriving a third control voltage, and a motor for controlling said valve means, in sense and degree according to the resultant of said control voltages.

20. In ground based flight training apparatus having a simulated aircraft control operable by a student pilot and means for producing a control quantity representing a function of a flight condition, means for loading said control in simulation of flight conditions comprising means responsive to said control and to the quantity representing a simulated flight condition for deriving a first control voltage representing a combined function of said flight condition and control displacement corresponding to a loading force component pretensioned spring structure operatively connected to said control for resisting displacement thereof from a neutral position, backing means for said spring structure, a follow-up actuator for varying the position of said backing means for varying the effectiveness of said spring structure acting on said control, means operatively connected to said control for deriving a second control voltage representing the force component applied to said control by the pilot, means operatively connected to said actuator for deriving a third control voltage representing the actuator force component, motive means jointly controlled by said three control voltages, and selector means controlled by said motive means for causing operation of said actuator in sense and degree according to the resultant of said control voltages.

21. In ground based flight training apparatus having a simulated aircraft control operable by a student pilot and means for producing a control quantity representing a function of a flight condition, means for loading said control in simulation of flight conditions comprising means responsive to said control and to the quantity representing a simulated flight condition for deriving control potential corresponding to a loading force component, pretensioned spring structure operatively connected to said control for resisting displacement thereof from a neutral position, backing means for said spring structure, a follow-up hydraulic actuator for varying the position of said backing means for varying the effectiveness of said spring structure acting on said control, means associated with said control for deriving other control potential representing the force component applied to said control by the pilot, means associated with said actuator for deriving other control potential representing the actuator force component, motive means jointly controlled by said control potentials, and selector valve means controlled by said motive means for causing operation of said actuator in sense and degree according to the resultant of said control potentials.

22. In ground-based flight training apparatus having a simulated aircraft control operable by a student pilot and means for producing a control quantity representing a function of airspeed, means for loading said control in simulation of flight conditions comprising means responsive to said control and to the quantity representing simulated air speed for deriving a first control voltage representing a combined function of air speed and control displacement corresponding to a loading force component, a pair of oppositely acting pretensioned springs operatively connected to said control and spring backing means selectively movable to increase the tension at one spring and decrease the tension at the opposing spring, a follow-up actuator operatively connected to said backing means for positioning the same, means operatively connected to said control and actuator for deriving control voltages representing respectively the pilot applied and actuator components of force, and means jointly controlled by all said control voltages for positioning said actuator in sense and degree according to the resultant of said voltages.

23. In ground based flight training apparatus having simulated aircraft flight controls operable by a student pilot and means for producing a control quantity representing a function of simulated airspeed, means for loading said flight controls to simulate flight conditions comprising motive power means operatively connected to a respective flight control for varying opposition to the force applied by the pilot tending to move the control from neutral position, said motive means being energized according to a computed control loading quantity representing combined effects of the displacement of said control from neutral and said airspeed function quantity, force responsive means operatively connected to said control for deriving according to the applied force on said control as distinguished from its displacement, a control quantity having a precise and pre-determined relation to the applied force on said flight control, said applied force control quantity constituting an answer signal in opposition to said computed force quantity for also energizing said motive means, said motive power means being controlled according to the resultant quantity so as to adjust the reactive force on the flight control.

References Cited in the file of this patent

UNITED STATES PATENTS

| | | |
|---|---|---|
| 2,485,291 | Kail | Oct. 18, 1949 |
| 2,519,233 | Davis et al. | Aug. 15, 1950 |